(12) United States Patent
Marsha

(10) Patent No.: US 7,588,509 B1  
(45) Date of Patent: Sep. 15, 2009

(54) INFINITELY VARIABLE GEAR TRANSMISSION WITH PARALLEL HYDRAULIC RATIO CONTROL

(76) Inventor: John David Marsha, 88 Briggs Hill Rd., Charlestown, NH (US) 03603

( * ) Notice: Subject to any disclaimer, the term of this patent is extended or adjusted under 35 U.S.C. 154(b) by 409 days.

(21) Appl. No.: 11/716,750

(22) Filed: Mar. 12, 2007

Related U.S. Application Data

(60) Provisional application No. 60/781,694, filed on Mar. 14, 2006.

(51) Int. Cl.  
*F16H 47/04* (2006.01)

(52) U.S. Cl. .............................. 475/73; 475/72; 475/76; 475/78; 475/83

(58) Field of Classification Search .................. 475/72, 475/73, 76, 78, 83, 84  
See application file for complete search history.

(56) References Cited

U.S. PATENT DOCUMENTS

| | | | |
|---|---|---|---|
| 3,055,233 A * | 9/1962 | Giles ............................ | 475/72 |
| 4,994,002 A * | 2/1991 | Valotto et al. ................. | 475/72 |
| 5,055,094 A | 10/1991 | Cataldo | |
| 5,928,098 A * | 7/1999 | Imamura et al. ............... | 475/81 |
| 5,951,424 A | 9/1999 | Briceland | |
| 6,358,174 B1 | 3/2002 | Folsom | |
| 6,358,178 B1 | 3/2002 | Wittkopp | |
| 6,371,878 B1 | 4/2002 | Bowen | |
| 6,964,627 B2 * | 11/2005 | Ai et al. ......................... | 475/5 |
| 6,981,928 B2 | 1/2006 | Inoue | |
| 6,997,838 B2 | 2/2006 | Folsom | |
| 7,055,507 B2 | 6/2006 | Kelly | |
| 7,192,373 B2 | 3/2007 | Bucknor | |
| 2005/0064974 A1 | 3/2005 | Bezian | |
| 2007/0037651 A1 | 2/2007 | McCrary | |

FOREIGN PATENT DOCUMENTS

JP 58102849 A * 6/1983

* cited by examiner

*Primary Examiner*—David D. Le

(57) ABSTRACT

Two parallel planetary gear sets with a common sun gear output are geared to a hydraulic pump and motor system. Input is applied to both planetary gear sets in parallel. Output is from both planetary gear sets in parallel. Two planetary gear set members, one in each set, are geared to the pump and motor and are used to control the ratio of the infinitely variable gear transmission (IVGT). The displacement ratio of the pump and motor, connected to these two members, controls the ratio of the IVGT.

3 Claims, 4 Drawing Sheets

INFINITELY VARIABLE GEAR TRANSMISSION WITH PARALLEL HYDRAULIC RATIO CONTROL

CROSS-REFERENCE TO RELATED APPLICATIONS

This application claims the benefit of PPA Ser. No. 60/781,694 filed 2006 Mar. 14 by the present inventor.

FEDERALLY SPONSORED RESEARCH

Not Applicable

SEQUENCE LISTING OR PROGRAM

Not Applicable

BACKGROUND OF THE INVENTION

This invention provides an answer to the application of gear trains to the evolving continuously variable transmission field, be it hydraulic pump and motor, electric generator and motor, toroidal, belt or any variator.

PRIOR ART

Some existing hydraulic Continuously Variable Transmissions, using variable displacement pumps and motors, experience high torque and system pressures leaving neutral because one of the hydraulic units is stopped in neutral. It takes a high amount of torque at very low rpm to transfer much to the output shaft. Neutral is a problem in some CVTs because it depends on zero displacement on only one of the hydraulic units. Reverse is also a problem in some CVTs because it depends either on shifting gears or on a hydraulic unit going over center. Overdrive in some CVTs also has similar problems, as one hydraulic unit is stopping relative to the input shaft, creating another high torque situation. The higher the torque and system pressure the larger the hydraulic units have to be.

OBJECTS AND ADVANTAGES

With this invention both units are rotating in neutral, thereby reducing the torque on the hydraulic system, as the IVGT is leaving neutral. Displacement is controlled by system pressure, maintaining the optimum system pressure and hydraulic volume. Neutral will be forced when both units are brought to zero displacement. Reverse and forward are controlled by the displacement ratio between pump and motor. Neither the pump nor the motor are stopped in normal operation.

SUMMARY

The IVGT consists of two parallel planetary gear sets with a common sun gear for output. Input is on the planet carrier of one set and the ring gear of the other. The remaining two gear set members are geared to a variable displacement pump and motor system for controlling the ratio of the infinitely variable transmission.

DRAWINGS

The following drawings illustrate the invention's function and some of its variations.

Figure 1A:
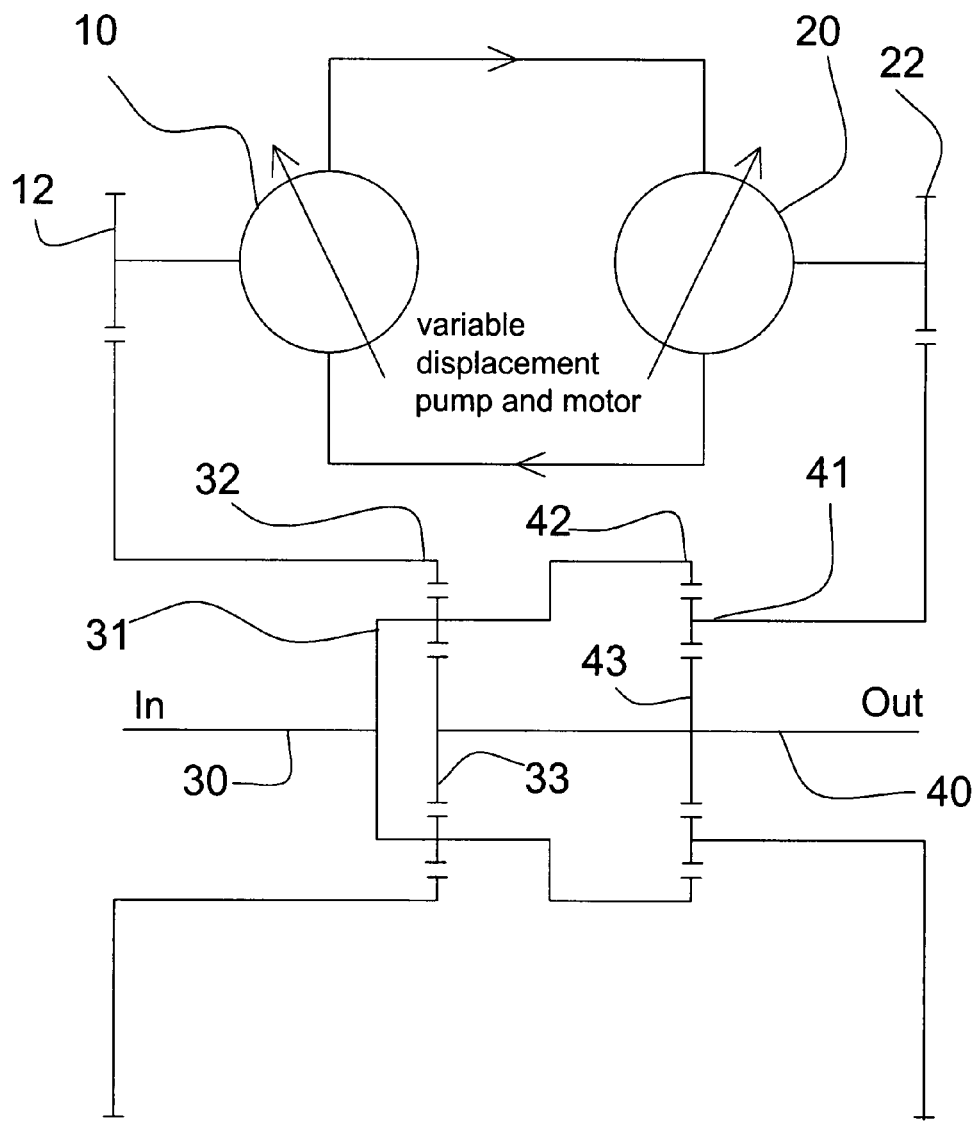
FIG. 1A is a schematic of two planetary gear sets with common sun output, using a variable displacement hydraulic pump and motor for controlling the overall IVT ratio.
Figure 2A:
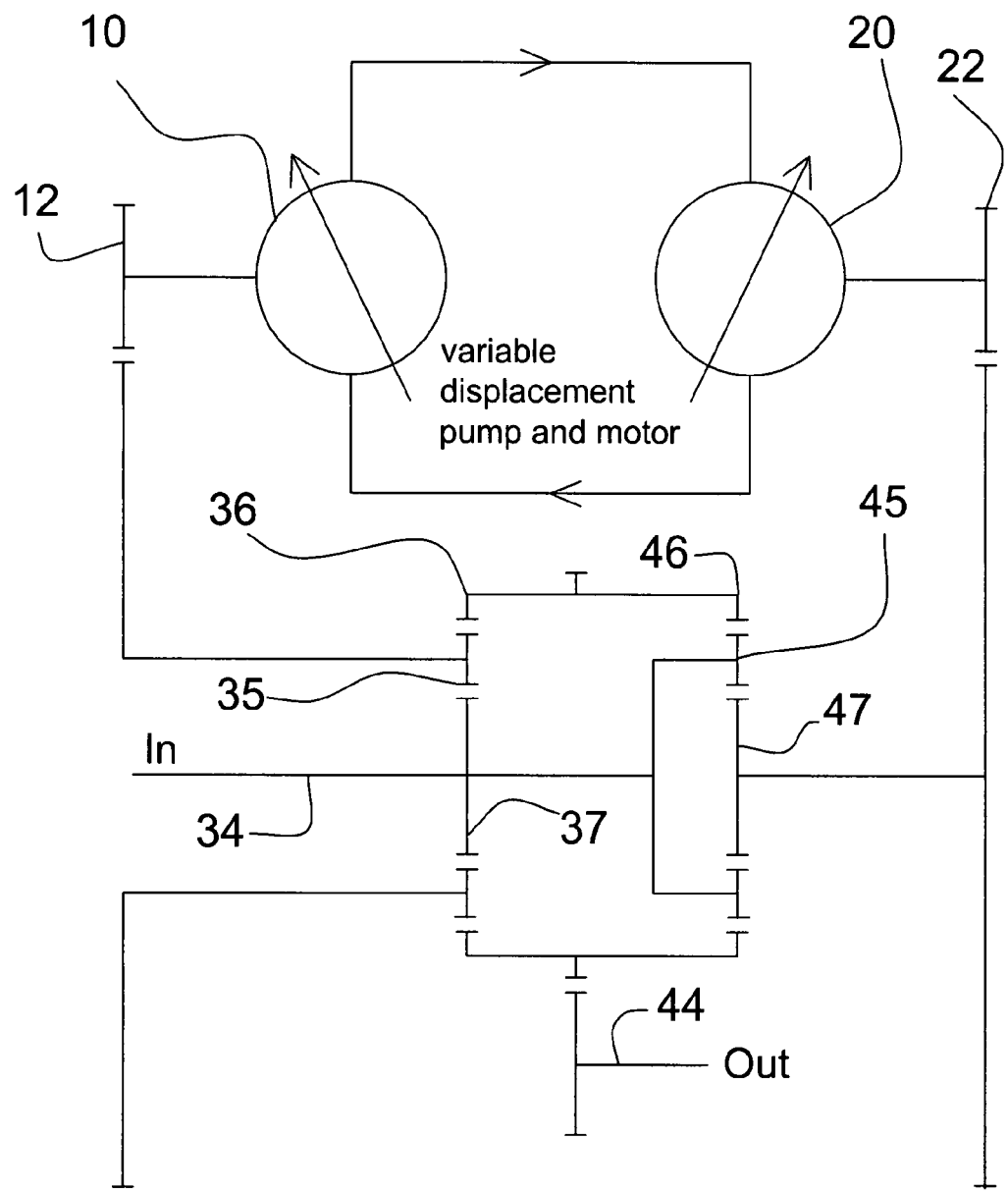
FIG. 2A is a schematic of two planetary gear sets with common ring output, using a variable displacement hydraulic pump and motor for ratio control.
Figure 3A:
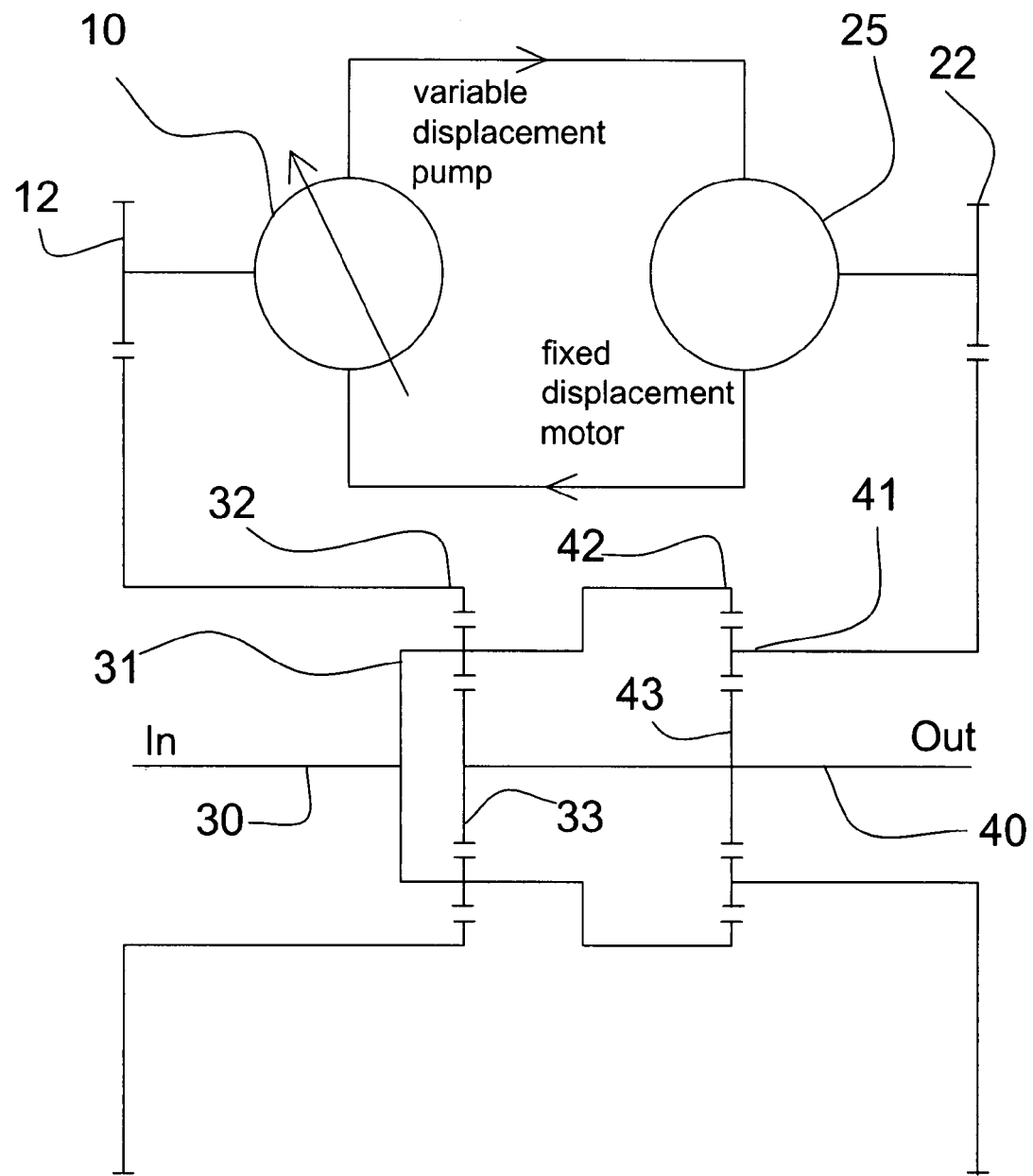
FIG. 3A is a schematic of two planetary gear sets with common sun output, using one variable displacement hydraulic pump and one fixed displacement motor.

REFERENCE NUMERALS 10 variable displacement hydraulic pump FIG. 1A
12 pump drive gear FIG. 1A
20 variable displacement hydraulic motor FIG. 1A
22 motor drive gear FIG. 1A
25 fixed displacement motor FIG. 3A
30 input shaft FIG. 1A
31 first planet carrier FIG. 1A
32 first ring gear FIG. 1A
33 first sun gear FIG. 1A
34 input shaft FIG. 2A
35 first planet carrier FIG. 2A
36 first ring gear FIG. 2A
37 first sun gear FIG. 2A
40 output shaft FIG. 1A
41 second planet carrier FIG. 1A
42 second ring gear FIG. 1A
43 second sun gear FIG. 1A
44 output shaft FIG. 2A
45 second planet carrier FIG. 2A
46 second ring gear FIG. 2A
47 second sun gear FIG. 2A

DETAILED DESCRIPTION

Figure 1B:
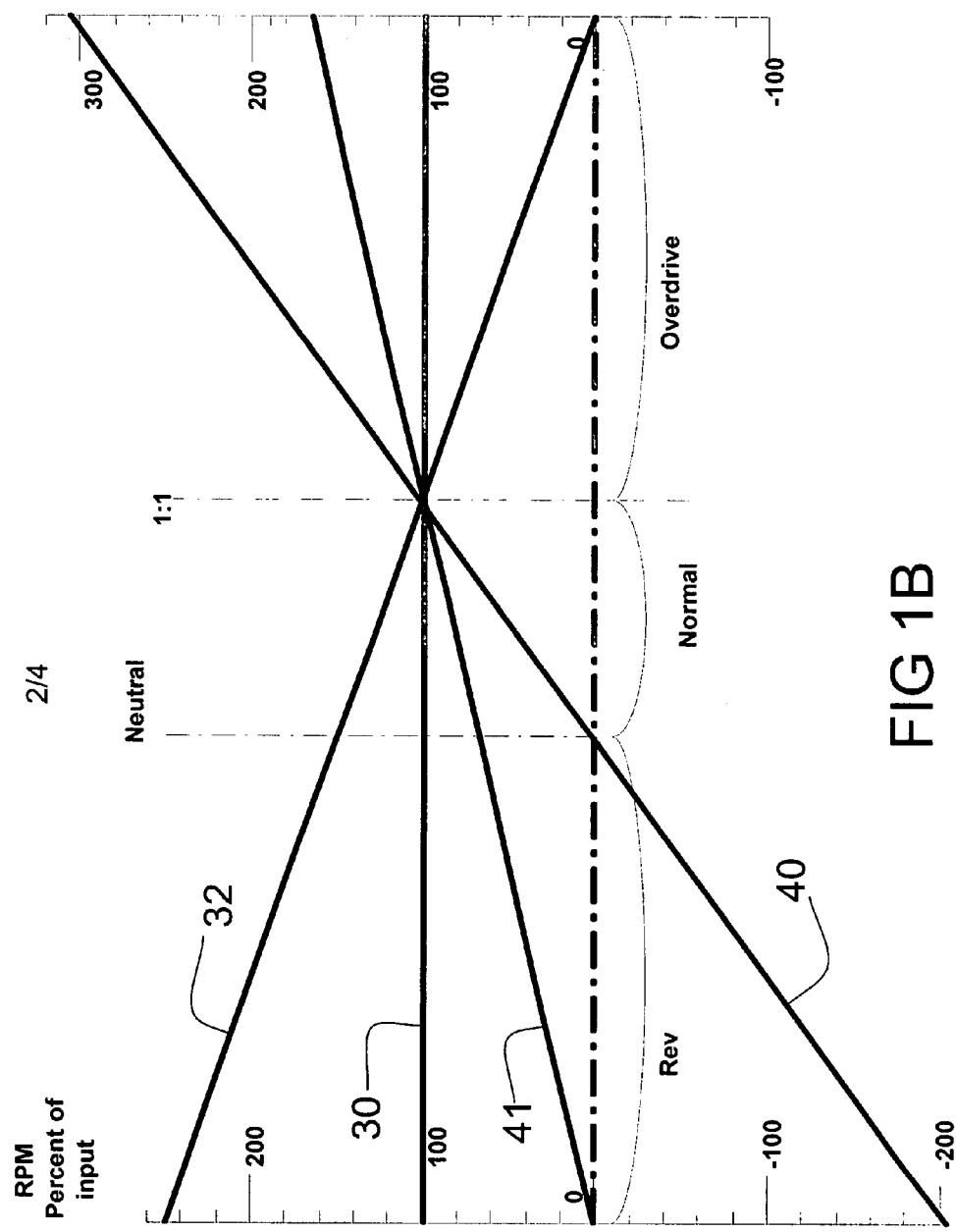
FIG. 1B is a chart showing the relative member speeds of FIG. 1A.

The following description is of the preferred embodiment, FIG. 1A, common sun output with hydraulic variator. The preferred embodiment in FIG. 1A is configured with 2 identical planetary gear sets, with sun gears 31 and 41 having 34 teeth and ring gears 32 and 42 having 70 teeth. The input shaft 30, from a prime mover, drives the planet carrier 31 of the first gear set and the ring gear 42 of the second gear set. The output shaft 40 is driven by the sun gear 33 of the first gear set and the sun gear 43 of the second gear set. The ring gear 32 on the first gear set is geared to the variable displacement hydraulic pump 10 through the pump's drive gear 12. The planet carrier 41 on the second gear set is geared to the variable displacement hydraulic motor 20 through the motor's drive gear 22. FIG. 1B is a chart showing speed relationships.

Operation

Preferred Embodiment

The input shaft 30 is driving both planetary gear sets in parallel. With zero displacement on the pump 10 and motor 20 the output shaft 40 does not turn. The first ring gear 32 will be turning in the direction of the input shaft 30 at 1.5 times the input speed. The second planet carrier 41 will be turning in the direction of the input shaft at 0.67 times the input speed. This is neutral ratio. Absolute neutral is accomplished by removing displacement from the pump 10 and the motor 20.

With some displacement on the pump 10 and zero displacement on the motor 20, the output shaft 40 turns in the direction of the input shaft 30 at 3 times the input speed. The ring gear 32 is stopped and the planet carrier 41 is turning in the direction of the input shaft 30 at 1.67 times the input speed. This is full overdrive.

With zero displacement on the pump 10, and some displacement on the motor 20, the output shaft 40 turns in the opposite direction, from the input shaft 30, at 2 times the input speed. The planet carrier 41 is stopped and the ring gear 32 is turning in the direction of the input shaft 30 at 2.49 times the input speed. This is full reverse.

With some displacement on the pump 10 and the same displacement on the motor 20, the output shaft 40 turns in the direction of the input shaft 30 equal to input speed. The ring gear 32 and the planet carrier 41 are also turning in the direction of the input shaft 30 at input speed. The only relative gear movement is between the pump drive gear 12 and ring gear 32 and also between the motor drive gear 22 and the planet carrier 41. This is 1:1.

This speed relationship can be seen in FIG. 1B. By varying the ratio of displacement between pump 10 and motor 20 the final ratio between input shaft 30 and output shaft 40 can be controlled, infinitely, from 2 times input speed in reverse, to 3 times input speed forward. The displacement of the pump and motor can be reduced or increased, to accommodate system pressure, without changing the overall transmission ratio, as long as the displacement ratio between the pump and motor remains the same.

CONCLUSION, RAMIFICATIONS, AND SCOPE

FIG. 1A is a schematic drawing of a simple solution to some complex problems with hydromechanical continuously variable transmissions. The Infinitely Variable Gear Transmission, with hydraulic ratio control, provides a more than ample spectrum for most conventional vehicles. It reduces torque on the pump and motor by having both the units turning as the transmission leaves neutral. Also, the pump and motor never need to stop. Neutral is more predictable and controllable. Reverse doesn't require any extra gears, clutches, or over-center hydraulic units.

While specific planetary gear set ratios were used for the above analysis, other ratios would be applicable in some instances. It should be understood that this arrangement of planetary gear sets would also provide benefits to toroidal, belt, generator-motor and other variators. It should also be understood that a fixed displacement motor, see FIG. 3A, could be beneficial in specific applications. FIG. 2A is a drawing of a similar gear set arrangement, using a common ring gear output instead of common sun gears. While the arrangement in FIG. 1A is the preferred embodiment, these other embodiments will provide different but valuable characteristics.

What is claimed is:

1. A common sun gear parallel planetary gear set arrangement for an infinitely variable transmission, comprising:
a first planetary gear set on a common axis with a second planetary gear set;
a first sun gear in mesh with planet gears of the first gear set;
a second sun gear in mesh with planet gears of the second gear set;
an output shaft keyed to said first sun gear and said second sun gear;
an input shaft connected to a planet carrier of said first gear set and a ring gear of said second gear set;
a variable displacement hydraulic pump geared to a ring gear of said first gear set;
a variable displacement hydraulic motor geared to a planet carrier of said second gear set and plumbed to said variable displacement hydraulic pump;
wherein a pump and motor displacement ratio controls a ratio of the transmission, including reverse, neutral, and forward.

2. A common ring parallel planetary gear set arrangement for an infinitely variable transmission, comprising:
a first planetary gear set on a common axis with a second planetary gear set;
a ring gear in mesh with planet gears of the first gear set;
said ring gear also in mesh with planet gears of the second gear set;
an output shaft geared to said ring gear;
an input shaft connected to a sun gear of said first gear set and a planet carrier of said second gear set;
a variable displacement hydraulic pump geared to a planet carrier of said first gear set;
a variable displacement hydraulic motor geared to a sun gear of said second gear set and plumbed to said variable displacement hydraulic pump;
wherein a pump and motor displacement ratio controls a ratio of the transmission, including reverse, neutral, and forward.

3. A common sun gear parallel planetary gear set arrangement for an infinitely variable transmission, comprising:
a first planetary gear set on a common axis with a second planetary gear set;
a first sun gear in mesh with planet gears of the first gear set;
a second sun gear in mesh with planet gears of the second gear set;
an output shaft keyed to said first sun gear and said second sun gear;
an input shaft connected to a planet carrier of said first gear set and a ring gear of said second gear set;
a variable displacement hydraulic pump geared to a ring gear of said first gear set;
a fixed displacement hydraulic motor geared to a planet carrier of said second gear set and plumbed to said variable displacement hydraulic pump;
wherein a pump and motor displacement ratio controls a ratio of the transmission, including reverse, neutral, and forward.

* * * * *